United States Patent
Aaron et al.

(10) Patent No.: US 8,711,222 B2
(45) Date of Patent: Apr. 29, 2014

(54) METHOD AND SYSTEM FOR CALIBRATING LASER PROFILING SYSTEMS

(75) Inventors: Charles W. Aaron, Salado, TX (US); Jeb E. Belcher, Austin, TX (US)

(73) Assignee: Georgetown Rail Equipment Company, Houston, TX (US)

( * ) Notice: Subject to any disclaimer, the term of this patent is extended or adjusted under 35 U.S.C. 154(b) by 387 days.

(21) Appl. No.: 13/095,783

(22) Filed: Apr. 27, 2011

(65) Prior Publication Data

US 2012/0274768 A1  Nov. 1, 2012

(51) Int. Cl.
*H04N 17/06* (2006.01)
*B61K 9/10* (2006.01)

(52) U.S. Cl.
USPC .......................... 348/148; 348/187; 348/153

(58) Field of Classification Search
CPC ....... H04N 17/06; B61K 9/10; G01B 11/2504
USPC .......................................... 348/148, 187, 153
See application file for complete search history.

(56) References Cited

U.S. PATENT DOCUMENTS

| | | | | |
|---|---|---|---|---|
| 3,864,039 A * | 2/1975 | Wilmarth | ...................... | 356/625 |
| 4,915,504 A * | 4/1990 | Thurston | ...................... | 356/604 |
| 5,503,019 A * | 4/1996 | Dewasmes | ...................... | 73/623 |
| 5,677,533 A * | 10/1997 | Yaktine et al. | ................. | 250/342 |
| 5,831,719 A * | 11/1998 | Berg et al. | ..................... | 356/5.13 |
| 5,845,881 A * | 12/1998 | Young et al. | ................... | 246/457 |
| 5,900,938 A * | 5/1999 | Huang | ........................... | 356/508 |
| 5,973,788 A * | 10/1999 | Pettersen et al. | ............. | 356/614 |
| 6,618,963 B2 * | 9/2003 | Theurer et al. | .................. | 37/198 |
| 6,647,891 B2 * | 11/2003 | Holmes et al. | ...................... | 104/2 |
| 6,948,254 B2 * | 9/2005 | Stiblert et al. | ................... | 33/502 |
| 6,964,113 B2 * | 11/2005 | Bridges et al. | ................... | 33/702 |
| 7,460,250 B2 * | 12/2008 | Keightley et al. | ............. | 356/625 |
| 7,463,348 B2 * | 12/2008 | Chung | ........................ | 356/237.1 |
| 7,659,972 B2 * | 2/2010 | Magnus et al. | ............ | 356/237.1 |
| 8,006,559 B2 * | 8/2011 | Mian et al. | ....................... | 73/643 |
| 8,078,025 B2 * | 12/2011 | Zhang et al. | ..................... | 385/106 |
| 2005/0111009 A1 * | 5/2005 | Keightley et al. | ............. | 356/602 |
| 2006/0017911 A1 * | 1/2006 | Villar et al. | .................... | 356/4.01 |
| 2009/0049936 A1 * | 2/2009 | Mian et al. | .................... | 73/865.8 |
| 2009/0073428 A1 * | 3/2009 | Magnus et al. | ............ | 356/237.1 |
| 2009/0112487 A1 * | 4/2009 | Zhang et al. | ..................... | 702/34 |
| 2010/0201972 A1 | 8/2010 | Marsh et al. | | |
| 2010/0238435 A1 | 9/2010 | Spalding | | |
| 2010/0256940 A1 | 10/2010 | Ogawa et al. | | |
| 2010/0295997 A1 * | 11/2010 | Chen | .............................. | 348/655 |
| 2010/0296068 A1 | 11/2010 | Shibazaki | | |
| 2011/0233293 A1 * | 9/2011 | Kral et al. | ...................... | 238/122 |

FOREIGN PATENT DOCUMENTS

| WO | WO2010053229 A1 | 5/2010 | | |
|---|---|---|---|---|
| WO | WO 2010053229 A1 * | 5/2010 | ............... | G01B 5/00 |

* cited by examiner

*Primary Examiner* — Christopher S Kelley
*Assistant Examiner* — Deirdre Beasley
(74) *Attorney, Agent, or Firm* — Parsons Behle & Latimer

(57) ABSTRACT

A laser profiling calibration system includes a light emitting device, a light-reflecting target, and an optical receiver. The light emitting device is configured to project a light and define a light plane. The light-reflecting target is configured to be positioned at multiple positions within the light plane, and has a plurality of non-reflective regions. The optical receiver is oriented to receive light reflected from the target, and further configured to capture a plurality of images, comprising at least one image at each of the target's multiple positions. The system is configured to use the plurality of images to calibrate the optical receiver within the light plane.

6 Claims, 5 Drawing Sheets

METHOD AND SYSTEM FOR CALIBRATING LASER PROFILING SYSTEMS

CROSS REFERENCE TO RELATED APPLICATIONS

This application incorporates by reference, in their entirety, U.S. Provisional Patent Application No. 60/584,769 entitled "SYSTEM AND METHOD FOR INSPECTING RAILROAD TRACK" and filed on Jun. 30, 2004; U.S. patent application Ser. No. 11/172,618, also entitled "SYSTEM AND METHOD FOR INSPECTING RAILROAD TRACK" and filed on Jun. 30, 2005; U.S. patent application Ser. No. 12/465,473, entitled "SYSTEM AND METHOD FOR INSPECTING SURFACES USING OPTICAL WAVELENGTH FILTERING" and filed on May 13, 2009; U.S. patent application Ser. No. 12/489,570, entitled "TILT CORRECTION SYSTEM AND METHOD FOR RAIL SEAT ABRASION" and filed on Jun. 23, 2009; and U.S. patent application Ser. No. 12/494,400, entitled "METHOD FOR GPS TO MILEPOST MAPPING" and filed on Jun. 30, 2009.

BACKGROUND

Railroad tracks are generally constructed on a base layer of compacted, crushed stone material. A layer of gravel ballast rests on top of this stone layer. Crossties are laid atop the base layer, and two parallel, flat-bottomed steel rails are attached to the crossties with fasteners, such as tieplates and spikes. After the rails are attached to the ties and the track has been checked for proper alignment, crushed stone ballast is then typically laid down between the ties to further support the ties and allow some adjustment of their position, while also allowing free drainage.

The majority of crossties in service are made of wood. Various other materials, such as concrete, steel, and composite or recycled material, are used in the manufacture of crossties. The crossties distribute the axle loads from the rails to the ballast layer below the crossties and contribute to the cushioning effect of the entire track structure. Over time, environmental factors can cause the crossties to deteriorate until they must be replaced. Annually, railroads in North America replace up to 2% or more of all wooden crossties. This constitutes several million crossties.

To manage the logistics of crosstie replacement and to quantify the need for new crossties, railroad inspectors attempt to grade the condition of crossties and the fastener system on a regular basis. This grading is most often done with a visual inspection to identify crossties and fasteners that are rotten, broken, split, or worn to an extent that their serviceable life is at or near its end. Additionally, the ballast on both sides of the railroad track must be inspected to ensure that it is properly graded, that there are no drainage problems, and/or other similar structural faults or problems. The process of visual inspection is quite time consuming. In practice, inspection of the track is performed by inspectors walking along the track to inspect and record the conditions of the crossties and/or fasteners, which are spaced approximately every 20 inches along the track. One particular North American railroad reports that a crew of three or four men can grade only about five to seven miles of track per day. With about 140,000 miles of railroad track in operational use in the United States today, that translates into a huge burden and cost for railroad maintenance. Therefore, systems of automatic and/or automated visual inspection, such as the Aurora vision system by Georgetown Rail Equipment Company of Georgetown, Tex., are extremely useful. Automatic inspection systems can be easily attached to a moving railroad car and can be configured to scan a railroad track while the cars are in motion. Such systems can use a scanning or profiling laser to determine a profile of railroad track components as the rail vehicle travels along the rails, with visual recognition systems that detect irregular profiles that indicate the presence of damaged or worn track components.

Optical inspection systems, like the Aurora vision system, can also be used for inspecting highways and streets. Road surfaces are principally made up of asphalt or concrete. Asphalt surfaces are constructed by combining a viscous bitumen binder with aggregate (e.g. sand, gravel and small stones). This surface is usually laid down upon a compacted, well-graded gravel base layer. Asphalt surfaces make up approximately 85 percent of the world's highway surfaces. On the other hand, concrete surfaces are usually a mixture of Portland cement, gravel, sand, and water. As is the case with asphalt road surfaces, concrete surfaces are often laid down on a compacted, well-graded gravel base layer. Concrete roadway surfaces can also include steel bars for reinforcement. Asphalt roadways have the advantage of being less expensive and permit significant plastic deformation before the surface fails. Concrete roadways, on the other hand, are significantly more expensive to install, but are typically stronger and more durable.

Both asphalt and concrete are susceptible to cracking, breaking, and structural failure caused in part by climatic effects and usage patterns. For instance, both asphalt and concrete are susceptible to deterioration due to freeze-thaw cycles. In addition to roadways made in asphalt and concrete, other relatively common surface materials include cobblestone and brick. These surfaces are also sensitive to environmental and use-based factors and prone to failure over time. For at least these reasons, it is important to regularly inspect and investigate roadway surfaces.

In the United States and China alone, there are over five million miles of paved highways. The task of manually performing a visual inspection of every mile of roadway is a tedious, time-consuming, and expensive task. Automatic inspection systems, like the Aurora system for railways, are an invaluable tool in the task of auditing the health of roads and highways and detecting cracks, flaws, and signs of failure.

However, it is desirable that the inspection system be properly calibrated in order to yield accurate results. Many vision calibration systems correct for common lens abnormalities such as linear distortion, barrel distortion, and pose estimation. However, since vision systems for scanning railroad tracks and other surfaces also need to recognize height variances, or spatial orientation, in the plane of the profiling laser in addition to across the surface and/or railroad tracks, it is desirable to calibrate such systems in both the laser and the surface or horizontal planes.

Image and vision calibration systems, often used in semiconductor lithography systems, for instance, usually only require calibration in one plane (referred to in this disclosure generally as the horizontal plane, though the plane is not necessarily completely horizontal), and therefore, a series of reference points, shapes, and other identifiable patterns can be used to calibrate in the horizontal plane. However, because railroad tracks and road surfaces have an additional depth component, representing the height of the metal rails, crossties, grooves, cracks, and joints in the surface of the roadway, and different varying depth components associated therewith, there is a need to calibrate in at least two planes.

It is also desirable to be able to calibrate a vision system outside of a laboratory or clean room environment, and without a fixed calibration target. Scanning a fixed target generally involves having a scanning system in motion, which can introduce errors into the calibration results. In addition, a fixed target can prove cumbersome and difficult to use outside of a laboratory environment.

The present invention is directed to overcoming, or at least reducing the effects of, one or more of the problems set forth above.

SUMMARY

It is therefore of interest to develop a calibration system that is simple and repeatable and can be used in a variety of locations and still yield accurate calibration results. It has been recognized that it would be advantageous to have a system and method for calibrating a profiling system concurrently in two planes.

In accordance with one embodiment thereof, the current disclosure provides a laser profiling calibration system including a light emitting device, a light-reflecting target, and an optical receiver. The light emitting device is configured to project a light and thereby define a light plane. The light-reflecting target is configured to be positioned at multiple positions within the light plane, and has a plurality of non-reflective regions. The optical receiver is oriented to receive light reflected from the target, and further configured to capture a plurality of images, comprising at least one image at each of the target's multiple positions. The laser profiling calibration system is configured to use the plurality of images to calibrate the optical receiver within the light plane.

In another embodiment, an optical railroad track inspection system includes at least one downwardly orientated laser device, attachable to a rail vehicle, configured to project a laser defining a substantially vertical laser plane. A target is connected to the rail vehicle. The target may be positioned at various vertical positions with respect to the rail vehicle and within the laser plane. The target is configured to be reflective and have a plurality of non-reflective regions spaced at known intervals. An optical receiver is attachable to the rail vehicle and oriented to receive laser light reflected from the target. The receiver is configured to capture a plurality of images, comprising at least one image at each of the target's multiple positions. The system is further configured to use the plurality of images to calibrate the optical receiver within the laser plane.

In another embodiment, a method for calibrating a laser profiling system includes projecting a laser toward a target thereby defining a laser plane, the target being positioned within the laser plane, and the target having a plurality of non-reflective regions spaced at known intervals. The method further includes receiving laser light reflected from the target with an optical receiver, and recording an image of the target. The preceding steps are repeated with the target at a plurality of positions within the laser plane in order to record a plurality of images of the target. The plurality of images may then be used for calibration purposes. The calibration can be performed by a processor either distinct from or integrated into the profiling system. Alternatively, the calibration may be performed by any number of manual and/or hardware-based means.

In another embodiment, a laser calibration system includes a light generating device, a target, and an optical receiver. The light generating device is configured to emit light in a plurality of predefined orientations. The target has a plurality of reflective and non-reflective regions, and is configured to be arranged to be within the plurality of predefined orientations at a plurality of predefined distances from the light generating device. The optical receiver is configured to capture the reflected light from the reflective regions of the target. The optical receiver is further configured to capture the reflected light for each of the plurality of predefined orientations and configured to capture the reflected light for each of the predefined distances. The system is configured to use data captured by the optical receiver in a calibration process.

These and other embodiments disclosed in the present application will be discussed more fully in the detailed description. The features, functions, and advantages can be achieved independently in various embodiments of the present application, or may be combined in yet other embodiments.

DETAILED DESCRIPTION

In the following detailed description, reference is made to the accompanying drawings that form a part hereof, and in which is shown by way of illustration specific embodiments in which the invention can be practiced. These embodiments are described in sufficient detail to enable those skilled in the art to practice the invention, and it is to be understood that other embodiments can be utilized and that various changes can be made without departing from the spirit and scope of the present invention. The following detailed description is therefore not to be taken in a limiting sense.

As noted above, it is desirable that optical railroad track and roadway surface inspection systems be calibrated in both the horizontal and the laser planes in order to yield accurate profiling results. It is also desirable to be able to calibrate a vision system outside of a laboratory or clean room environment, and without a fixed calibration target. It is therefore of interest to develop a calibration system that is simple and repeatable and can be used in a variety of locations and still yield accurate calibration results.

Figure 1:
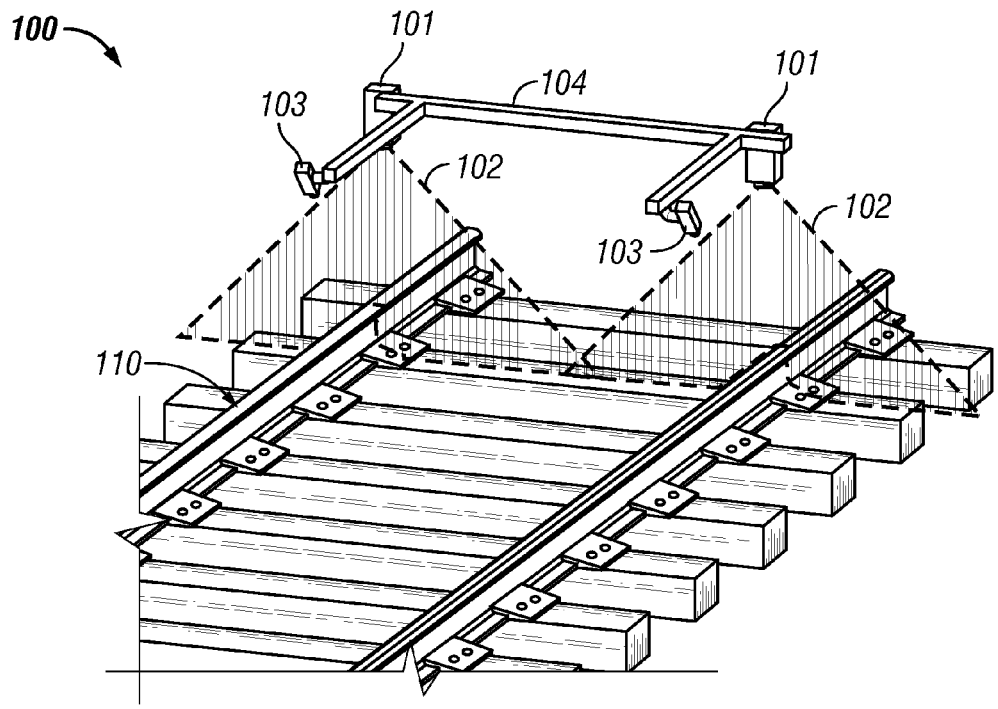
FIG. 1 shows a perspective view of an embodiment of a laser profiling system in relation to a railroad track.

Advantageously, a system and method has been developed for calibrating laser profiling systems outside of the laboratory environment, without introducing motion of the profiling system into the calibration method. It has been found that this system and method yields accurate and easily-repeatable results. FIG. 1 shows a laser profiling system 100 according to one possible embodiment. As shown in FIG. 1, line laser generators 101 and optical receivers 103 are attached to a chassis 104. Line laser fields 102 are shown emanating from the line lasers 101 toward a railroad track 110. In operation, as the laser profiling system moves relative to the railroad track 110, the optical receivers 103 collect image information as it is reflected from the railroad track 110 by laser fields 102. If configured correctly, a laser profiling system can quickly and accurately scan large portions of railroad track in order to find faults and/or problems. However, in order to achieve accurate results, it is desirable to calibrate the laser profiling system, both across the top of the railroad rails and ties, also referred to as calibrating in the horizontal plane, and also along the depth or the height of the railroad tracks, also known as the laser plane or light plane.

Figure 2:
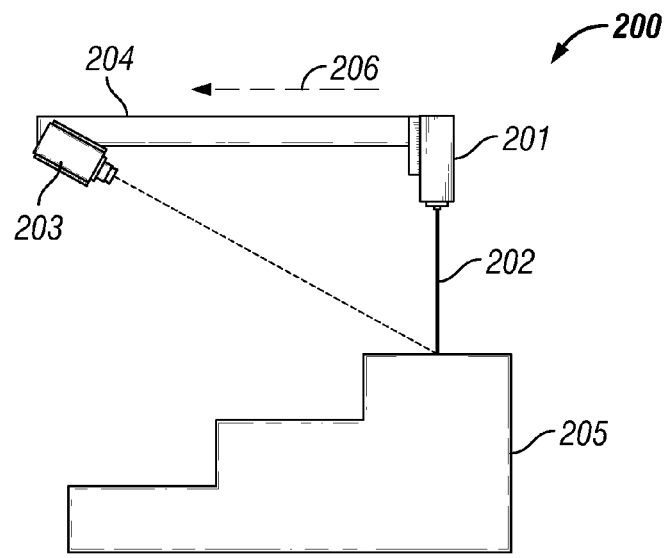
FIG. 2 shows a profile view of an embodiment of a laser profiling apparatus calibration system.

FIG. 2 shows one possible embodiment of a system that allows calibration of a laser profiling system 200. In this figure, the line laser unit 201 and an optical receiver 203 are attached to a chassis unit 204. The laser unit 201 emits a laser light 202 which reflects off of a target 205 and is captured (shown by broken line) by the optical receiver 203. The target 205 allows calibration of the laser profiling system both along the depth plane (not shown here), often called the horizontal plane, and also along the height plane, often called the laser plane.

In operation, line laser unit 201 emits a laser light 202 which reflects off of the target 205. The profiling system 200 moves relative to the target 205, or the target moves relative to the profiling system. As the line laser field 202 sweeps from right to left, as represented by the arrow 206, it travels down a series of "steps" on the target 205. The light 202 reflects off the target 205 and is captured by the optical receiver 203. When performed this way, and generally speaking when calibrating while in motion, error might be introduced into the system.

Figure 3:
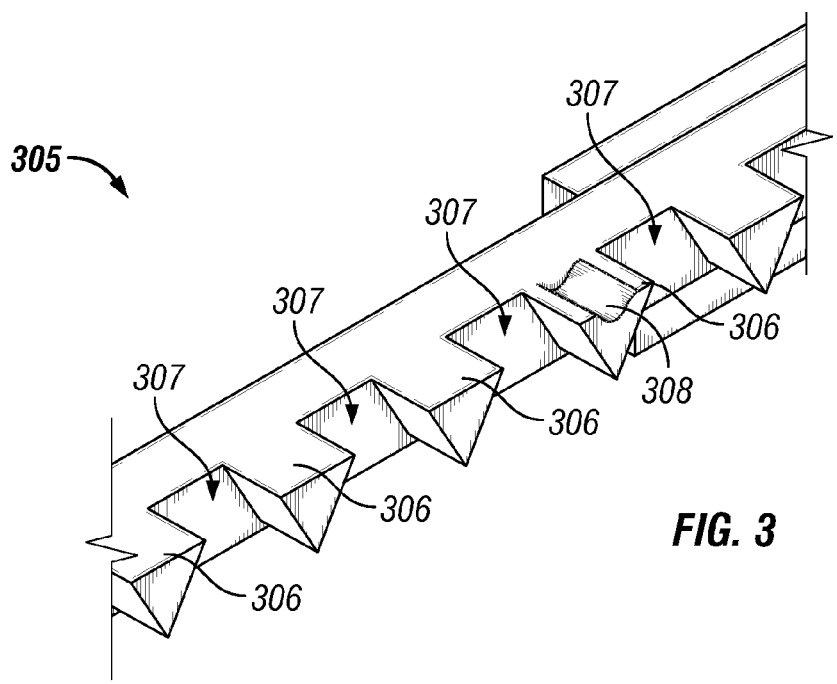
FIG. 3 shows a perspective view of an embodiment of a calibration system target having a series of reflective and non-reflective regions comprising protrusions and gaps.

FIG. 3 shows a perspective view of one embodiment of a target 305. This view shows that the target 305 includes a series of protrusions 306 and gaps 307. The protrusions 306 and gaps 307 can be thought of alternatively as a series of reflective and non-reflective regions of the target 305. One skilled in the art would readily recognize that any number of possible embodiments employing patterns, grills, holes, light absorbent material, etc. could be used to create an acceptable target for embodiments according to this disclosure. Also present in FIG. 3, is a unique marker or central indicator 308. Central indicator 308 can facilitate identification of the central point of target 305 for calibration purposes and can take a multitude of different forms. In some cases, the central indicator can be nothing more than the protrusion being a different width than the other protrusions.

In operation, each protrusion 306 can be 1 inch in length, and each gap 307 can be 1 inch in length. A target 305 can be configured so as to have a center-most protrusion, and the central indicator 308 can be positioned on the center-most protrusion so as to enable and facilitate identification of the center-most protrusion. With this configuration, the calibration system can easily identify the center of each target 305 and correctly align its calibration analysis. Of course, the disclosure supports a number of other non-reflective target arrangements that can be configured to achieve a similar result.

Figure 4:
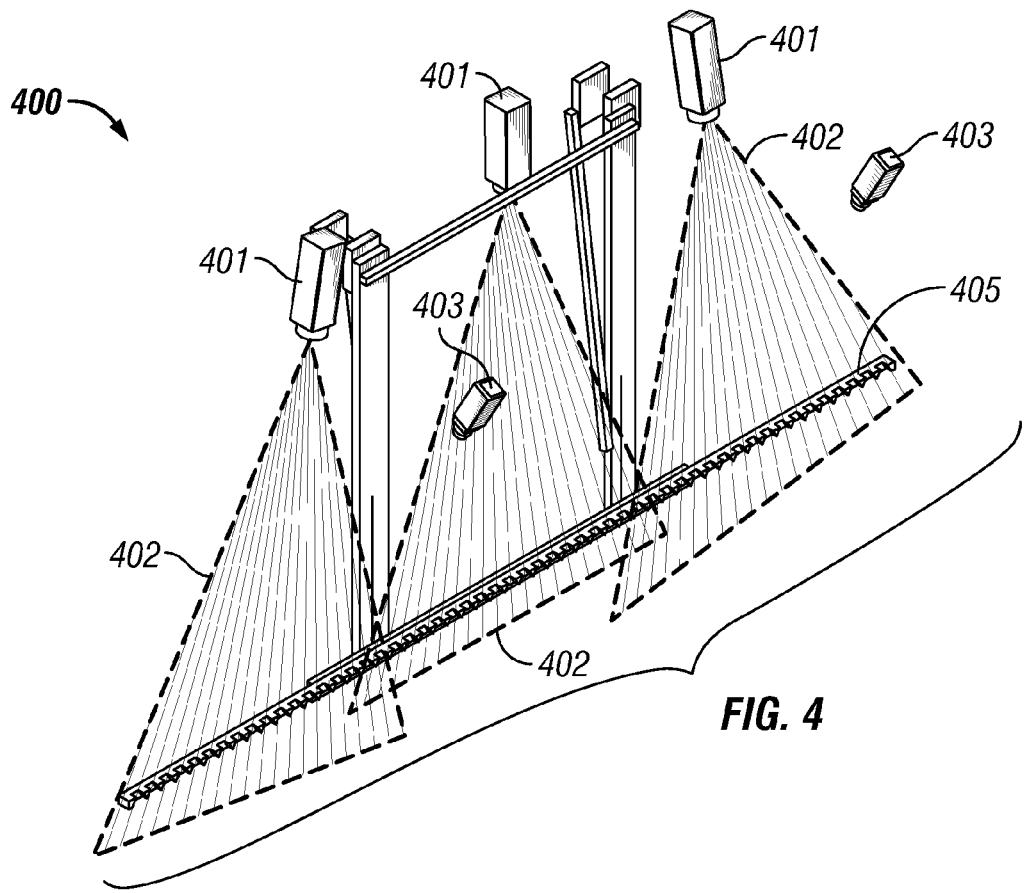
FIG. 4 shows a perspective view of another embodiment of a laser profiling apparatus calibration system.

FIG. 4 shows a perspective view of a laser profiling system 400 according to another possible embodiment. FIG. 4 shows the laser units 401, emitting laser waves 402 onto a target 405, representing either one or a plurality of targets, and optical receivers 403 arranged to receive images of the target 405. As can be seen in FIG. 4, a plurality of laser units 401 can be employed in order to achieve coverage of sufficient width with relation to railroad tracks. Additionally, a plurality of targets 405 may need to be used in order to create an overall target width that is sufficiently wide. Therefore, multiple optical receivers 403 can be configured to capture the plurality of images that will result from the target scanning operation. Of course, a variety of different embodiments can be used in order to achieve a similar result.

In operation, the laser units 401 emit laser light so as to create a laser field 402. The target 405 is configured and arranged so as to be moveable with the laser field 402. The target 405, positioned as disclosed in relation to FIG. 3, reflects light which is in turn captured by the optical receiver units 403. The target 405 can be manipulated and/or fixed at a plurality of positions or heights in the laser field 402, and the optical receiver units 403 can capture light reflection data reflected from the target 405 at each new position. The process of moving the target 405 to a new position and capturing image information via optical receiver units 403 can be repeated for a plurality of target positions in the laser field 402 so as to create an aggregate of "images" of the target 405, each image being at a different position relative to the optical receiver.

Figure 5A:
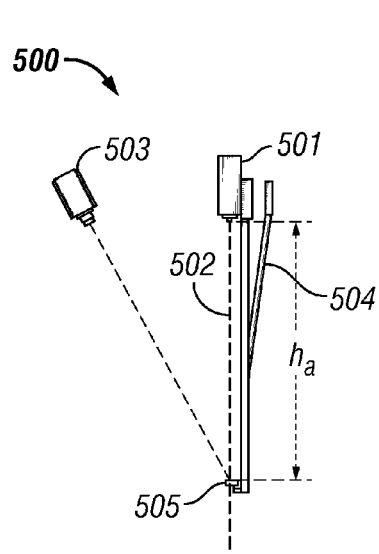
FIG. 5A shows a profile view of an embodiment of a laser profiling apparatus calibration system with the target at a predetermined location in the laser plane.
Figure 5B:
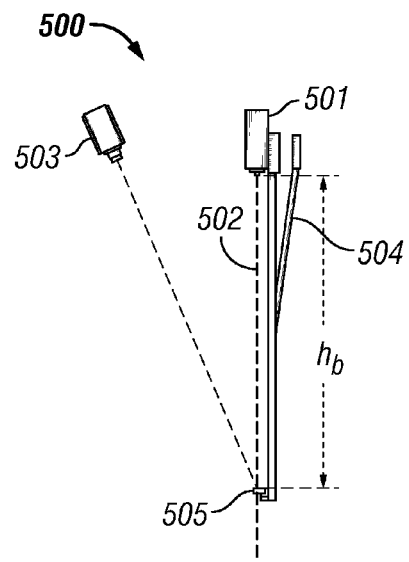
FIG. 5B shows a profile view of an embodiment of a laser profiling apparatus calibration system with the target at another predetermined location in the laser plane.
Figure 5C:
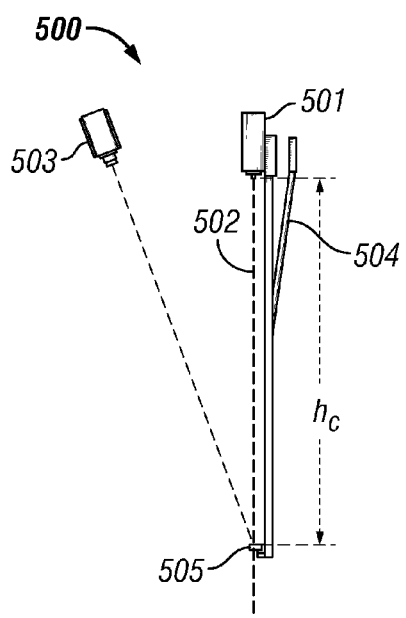
FIG. 5C shows a profile view of another embodiment of a laser profiling apparatus calibration system with the target at yet another predetermined location in the laser plane.

FIGS. 5A, 5B, and 5C show a profile view of a laser profiling system 500. Each figure shows a laser unit 501, emitting a laser wave 502, the laser wave 502 reflecting off of a target 505, and an optical receiver unit 503 being configured to capture an image of the target 505. The laser profiling system is attached to a chassis 504. The chassis can be connected to a rail car or some other device configured to travel along a railroad track (see, e.g., FIG. 7). Each of FIGS. 5A, 5B, and 5C depict a different distance between laser unit 501 and target 505, $h_a$, $h_b$, and $h_c$, respectively. These different distance values represent three theoretical positions for the target 505. Of course, a plurality of positions could exist in order to accurately calibrate the laser profiling system. Additionally, while only using three positions of the target 505 can lead to a reasonable calibration of the laser profiling system 500, it may be desirable to use more positions of the target 505 in the creation of an aggregate image file.

Figure 6:
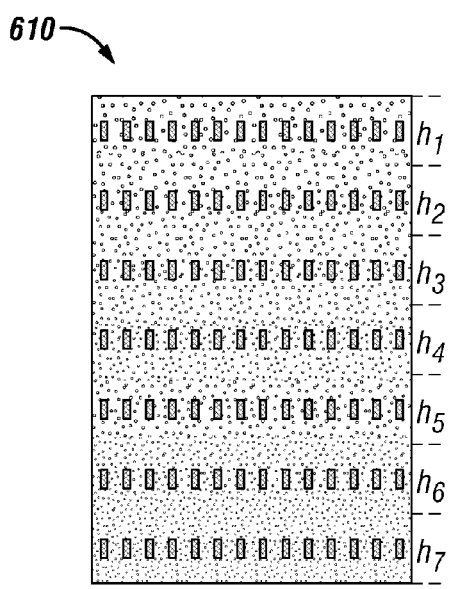
FIG. 6 shows a graphical representation of an aggregate image file containing a plurality of target images taken at a plurality of predetermined locations using an embodiment of a laser profiling system calibrated according to the present application.

FIG. 6 represents one possible graphical representation 610 of the image data stored by an optical receiver of a laser profiling system. Such an aggregate file can be created as each image of target 505 is taken and added to the preceding image, or plurality of preceding images, already taken. Additionally, a different color can be assigned to each image representing every distinct target position and thereby providing a visually recognizable cue as to target height. In FIG. 6, the visual cues representing different target positions are shown by using a different mixture of "static noise." Of course, in operation, this could also represent different colors, different hues, different shades or gradients, etc. In FIG. 6, $h_1$ through $h_7$ represent a plurality of different target heights.

In one embodiment, the optical receivers 403 are configured to record and collect the laser light reflecting off of the target 405. This data or image information may be collected a plurality of times at each of a plurality of different vertical target positions (see e.g., FIGS. 5A-5C) to create an aggregated image, as represented by FIG. 6, of the optical receivers 403 vision, and can show a variety of potential vision issues including any vision abnormalities and/or problems requiring calibration attention.

In operation, the file can be interpreted by a calibration system processor (not shown). The system can analyze the information contained at each target position (see, e.g., $h_a$, $h_b$, and $h_c$ in FIGS. 5A, 5B, and 5C). The processor can recognize discrepancies along the horizontal or the laser plane, and can introduce a correction parameter into the profiling system to account for the discrepancies. Or, alternatively, the system can correct the discrepancies via other means.

Figure 7:
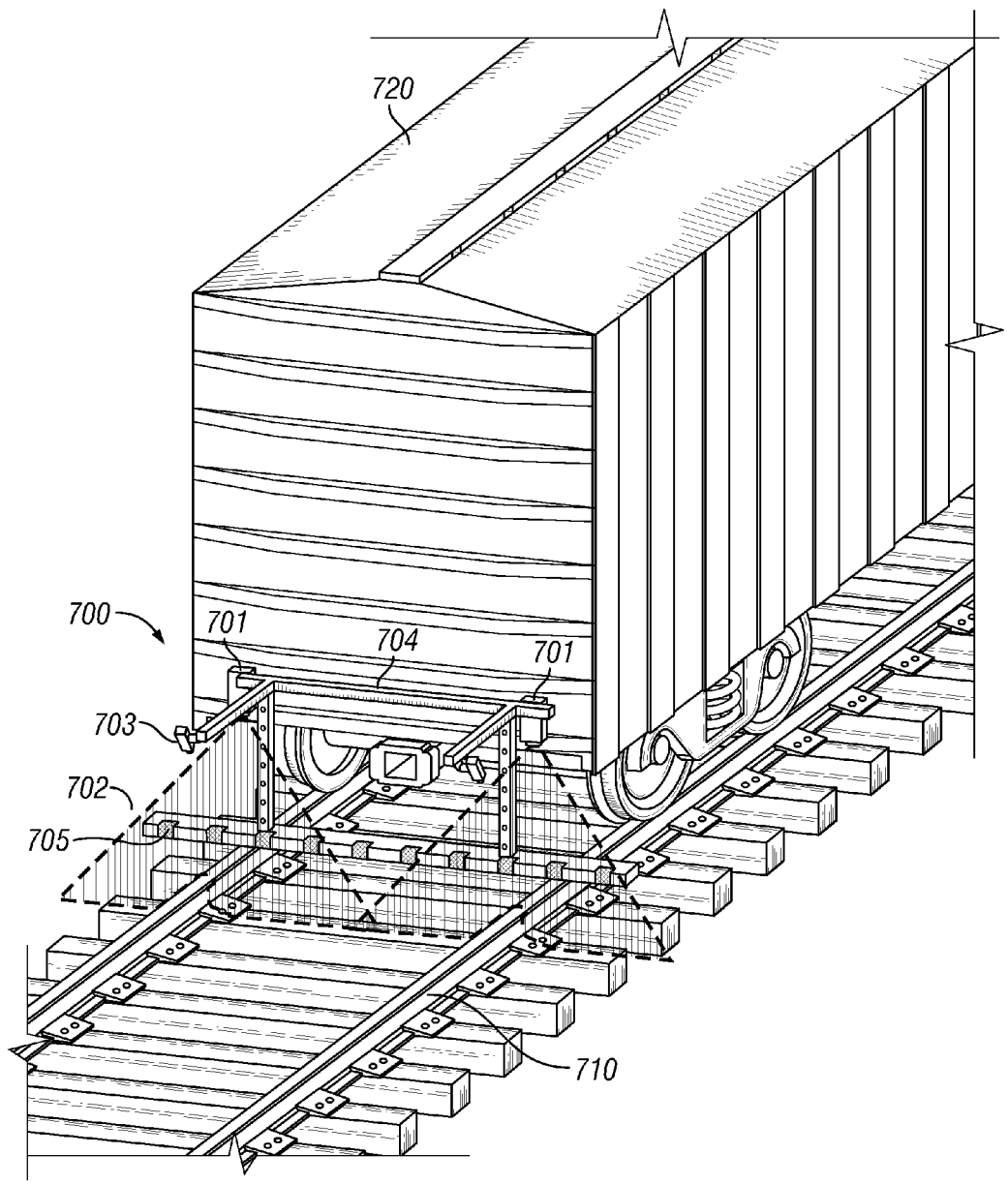
FIG. 7 shows a perspective view of an embodiment of a laser profiling apparatus attached to a rail car.

FIG. 7 shows a laser profiling system 700 affixed to a rail car 720 representing one possible embodiment disclosed in the current application. The laser profiling system 700 comprises a chassis 704 connectively affixed to a rail car 720, and laser units 701 and optical receiver units 703 also attached to the chassis. The target 705 is positioned in the laser fields 702 emitted by the laser units 701. The rail car 720 is shown on the rails 710.

In operation, the profiling system 700 can be calibrated outside of laboratory environment and without large or unwieldy targets, like the target 205 discussed in FIG. 2. Here, target 705 is configured to move substantially vertically within the laser fields 702. As the target's position changes, optical receivers 703 are configured to capture images from the reflected laser light 702. The images can be aggregated in an image file, like the one in FIG. 6, by the optical receivers 703 or some processing unit (not shown).

Figure 8:
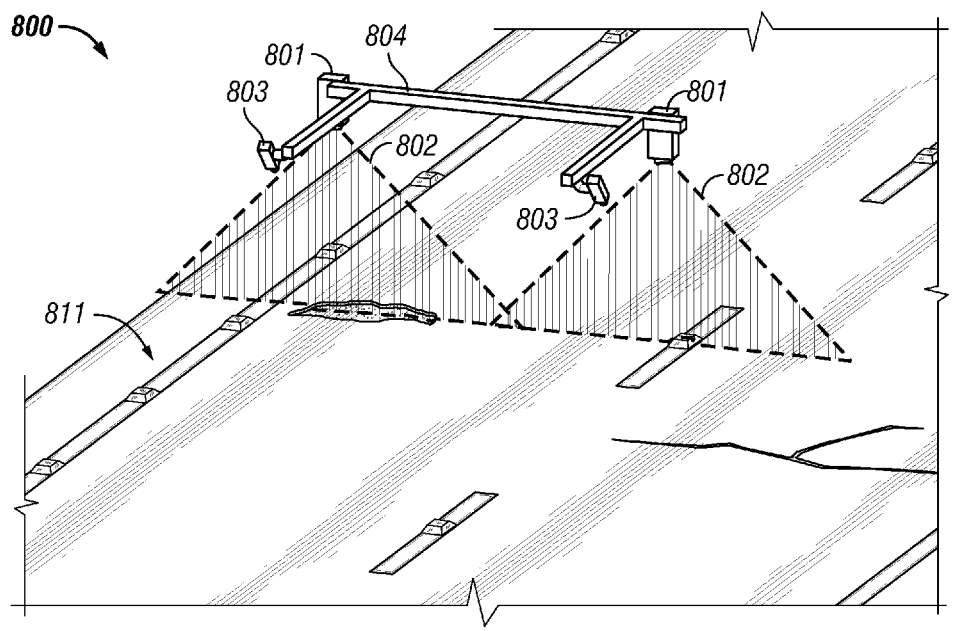
FIG. 8 shows a perspective view of an embodiment of a laser profiling system in relation to a roadway.

FIG. 8 shows a laser profiling system 800 in operation over a roadway 811. The laser profiling system 800 comprises a chassis 804 on which laser units 801 and optical receiver units 803 are mounted. The laser units 801 are configured to emit a laser field 802 towards the surface of the roadway and receiver units 803 are configured to capture images of the laser light reflecting off the roadway. The images may then be used in order to evaluate the health of the roadway and its structural parts.

In operation, the laser units 801 can emit a laser field towards the surface of the roadway 811. The surface of the roadway 811, any cracks or faults thereof, and/or any structural or supplemental parts (such as reflectors) can reflect the light of the laser field which can be captured by the optical receiver units 803. The profiling system can aggregate the image information in order to create a picture of the roadway 811 to monitor the state of the surface.

Figure 9:
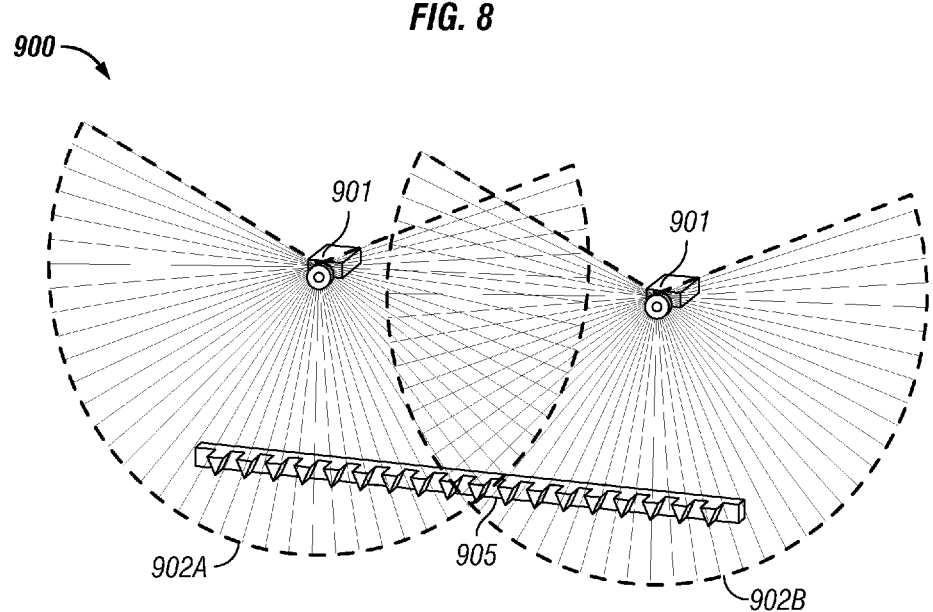
FIG. 9 shows a profile view of an embodiment of a laser profiling apparatus calibration system with spinning laser units.

FIG. 9 shows another embodiment of a laser profiling system 900. In this embodiment, the laser units 901 are spinning laser units. The spinning laser units 901 can also comprise receiver components (not shown) that can be configured to collect image information defined by the reflection of laser light emitted by the spinning laser units 901. The spinning laser units 901 sweep over a target 905, creating laser sweep fields 902A and B. The target 905 comprises a plurality of reflective and non-reflective regions which can be a plurality of protrusions and gaps, as discussed above. As the laser light 902 sweeps over the target 905, the receiver components (not shown) capture images of the reflected light for calibration purposes, in the manner disclosed above.

In operation, the spinning laser units, 901 can emit laser light while spinning. The laser light can reflect off of the target 905 and be captured by the receiver units contained in the spinning laser units 901. Alternatively, external optical receiver units can be used. The profiling system 900 can be configured to store image information related to the light captured by the receiver units to be used for calibration and representing the reflection and/or non reflection of laser light off of the target 905, which can comprise a plurality of protrusions, gaps, reflective, and/or non-reflective regions. The target 905 can be further configured to move within the plane defined by the spinning laser fields 902A and B. The system 900 can be further configured to aggregate image information comprising a plurality of images of the target at each of the plurality of target positions within the spinning laser fields 902A and B.

Although the system and method disclosed herein has been described in terms of certain embodiments, other embodiments that are apparent to those of ordinary skill in the art, including embodiments that do not provide all of the features and advantages set forth herein, are also within the scope of this invention. Accordingly, the scope of the present disclosure is defined only by reference to the appended claims and equivalents thereof.

What is claimed is:

1. An optical railroad track inspection system, comprising:
at least one downwardly oriented laser device, attachable to a rail vehicle, configured to project a laser defining a substantially vertical laser plane;
a target connected to the rail vehicle, wherein the target may be positioned at various vertical positions with respect to the rail vehicle and within the laser plane, the target being reflective and having a plurality of non-reflective regions spaced at known intervals;
an optical receiver, attachable to the rail vehicle and oriented to receive laser light reflected from the target, configured to capture a plurality of images, comprising at least one image at each of the target's multiple positions; and
the inspection system configured to use the plurality of images to calibrate the optical receiver within the laser plane.

2. The optical railroad track inspection system of claim 1, wherein the laser is a line-generating laser.

3. The optical railroad track inspection system of claim 1, wherein the plurality of non-reflective regions comprise a series of gaps defined by sides of adjacent, disconnected upstanding protrusions of the target.

4. The optical railroad track inspection system of claim 3, wherein the protrusions and gaps alternate in a regular linear pattern.

5. The optical railroad track inspection system of claim 3, wherein the series of protrusions and gaps includes a center-most protrusion of the target, said center-most protrusion comprising a unique marker to facilitate identification of the target's center.

6. The optical railroad track inspection system of claim 1, the target being separate from a railroad track.

* * * * *